(12) United States Patent
Huang et al.

(10) Patent No.: US 11,565,472 B2
(45) Date of Patent: Jan. 31, 2023

(54) ADDITIVELY FORMED 3D OBJECT WITH CONDUCTIVE CHANNEL

(71) Applicant: Hewlett-Packard Development Company, L.P., Houston, TX (US)

(72) Inventors: Wei Huang, Palo Alto, CA (US); Lihua Zhao, Palo Alto, CA (US); Gary J. Dispoto, Palo Alto, CA (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 598 days.

(21) Appl. No.: 16/098,106

(22) PCT Filed: Jul. 21, 2016

(86) PCT No.: PCT/US2016/043306
§ 371 (c)(1),
(2) Date: Oct. 31, 2018

(87) PCT Pub. No.: WO2018/017096
PCT Pub. Date: Jan. 25, 2018

(65) Prior Publication Data
US 2019/0143605 A1   May 16, 2019

(51) Int. Cl.
*B29C 64/393* (2017.01)
*B33Y 10/00* (2015.01)
(Continued)

(52) U.S. Cl.
CPC .......... *B29C 64/393* (2017.08); *B29C 64/153* (2017.08); *B29C 64/336* (2017.08);
(Continued)

(58) Field of Classification Search
CPC ... B29C 64/393; B29C 64/153; B29C 64/336; B29C 70/882; B33Y 10/00; B33Y 30/00; B33Y 50/02; B33Y 70/00; B33Y 80/00
See application file for complete search history.

(56) References Cited

U.S. PATENT DOCUMENTS 9,533,451 B2   1/2017   Folgar et al.
9,545,669 B2   1/2017   Aklint et al.
(Continued)

FOREIGN PATENT DOCUMENTS

CN   102971805 A   3/2013
CN   203324610   12/2013
(Continued)

OTHER PUBLICATIONS

"Multi Jet Fusion Technology, A disruptive 3D printing technology for a new era of manufacturing." HP Technical white paper, Oct. 31, 2013, 8 pages.
(Continued)

*Primary Examiner* — Larry W Thrower
(74) *Attorney, Agent, or Firm* — Shook, Hardy & Bacon L.L.P.

(57) ABSTRACT

A 3D object is additively formed via arranging non-conductive material relative to a receiving surface. During additive formation of the 3D object, a conductive channel is formed as part of the 3D object. In some instances, non-destructive fracture sensing is performed via measurement of an electrical parameter of the conductive channel.

8 Claims, 9 Drawing Sheets

(51) Int. Cl.
  *B33Y 80/00* (2015.01)
  *B29C 70/88* (2006.01)
  *B29C 64/336* (2017.01)
  *B33Y 30/00* (2015.01)
  *B33Y 50/02* (2015.01)
  *B29C 64/153* (2017.01)
  *B29C 64/165* (2017.01)
  *B29C 64/10* (2017.01)
  *B29C 64/106* (2017.01)
  *G01N 27/00* (2006.01)

(52) U.S. Cl.
  CPC ............ *B29C 70/882* (2013.01); *B33Y 10/00* (2014.12); *B33Y 30/00* (2014.12); *B33Y 50/02* (2014.12); *B33Y 80/00* (2014.12); *B29C 64/10* (2017.08); *B29C 64/106* (2017.08); *B29C 64/165* (2017.08); *G01N 27/002* (2013.01)

(56) References Cited

U.S. PATENT DOCUMENTS

| | | |
|---|---|---|
| 10,766,246 B2 | 9/2020 | Nauka et al. |
| 10,974,496 B2 | 4/2021 | Wright et al. |
| 2004/0159978 A1 | 8/2004 | Nielsen et al. |
| 2006/0158456 A1 | 7/2006 | Zinniel et al. |
| 2006/0169989 A1 | 8/2006 | Bhattacharya et al. |
| 2010/0111521 A1* | 5/2010 | Kim .................... H04L 1/24 398/10 |
| 2011/0169704 A1 | 4/2011 | Ajayan et al. |
| 2011/0217544 A1 | 9/2011 | Young et al. |
| 2014/0036455 A1 | 2/2014 | Eduardo |
| 2014/0238153 A1 | 8/2014 | Wood et al. |
| 2014/0268604 A1* | 9/2014 | Wicker ................ B29C 70/885 361/760 |
| 2015/0069649 A1 | 3/2015 | Bai et al. |
| 2015/0197062 A1 | 7/2015 | Shinar et al. |
| 2015/0201500 A1 | 7/2015 | Shinar |
| 2015/0258706 A1 | 9/2015 | Okamoto et al. |
| 2015/0270089 A1* | 9/2015 | Ghanea-Hercock ..... B05D 1/36 313/308 |
| 2015/0352785 A1 | 12/2015 | Folgar et al. |
| 2015/0369767 A1 | 12/2015 | Steuben |
| 2016/0039145 A1 | 2/2016 | Steiner |
| 2016/0198576 A1 | 7/2016 | Lewis et al. |
| 2016/0295702 A1 | 10/2016 | Heikkinen et al. |
| 2016/0368054 A1 | 12/2016 | Ng et al. |
| 2017/0015065 A1* | 1/2017 | Potter .................. B29C 64/393 |
| 2017/0072463 A1 | 3/2017 | Ng et al. |
| 2019/0134705 A1 | 5/2019 | Sheinman et al. |

FOREIGN PATENT DOCUMENTS

| | | | |
|---|---|---|---|
| CN | 105453709 | 3/2016 | |
| CN | 106313573 A | 1/2017 | |
| CN | 107548345 A | 1/2018 | |
| CN | 107771109 A | 3/2018 | |
| RU | 133287 U1 | 10/2013 | |
| RU | 2564604 C1 | 10/2015 | |
| WO | WO-2007039450 A1 | 4/2007 | |
| WO | 2014/152884 A1 | 9/2014 | |
| WO | WO-2014200428 A1 | 12/2014 | |
| WO | WO-2015112641 A1 | 7/2015 | |
| WO | WO-2015136277 A1 * | 9/2015 | .............. B22F 10/00 |
| WO | 2015/167530 A2 | 11/2015 | |
| WO | 2015/200189 A1 | 12/2015 | |
| WO | 2016/065260 A1 | 4/2016 | |
| WO | WO-2016053312 A1 | 4/2016 | |
| WO | 2016/205758 A1 | 12/2016 | |
| WO | 2017/019102 A1 | 2/2017 | |

OTHER PUBLICATIONS

Rubaiyet Iftekharul Haque et al., "Fabrication of Capacitive Acoustic Resonators Combining 3D Printing and 2D Inkjet Printing Techniques", Oct. 14, 2015, http://webcache.googleusercontent.com/search?q=cache:pa-xBI7OIVcJ:www.mdpi.com/1424-8220/15/10/26018/pdf+&cd=3&hl=en&ct=clnk&gl=in.

The Future of HP's Multi Jet Fusion 3D Printing, Retrieved from Internet: http://www.engineering.com/3DPrinting/3DPrintingArticles/ArticleID/12298/The-Future-of-HPs-Multi-Jet-Fusion-3D-Printing.aspx, 2016, 9 pages.

* cited by examiner

ADDITIVELY FORMED 3D OBJECT WITH CONDUCTIVE CHANNEL

BACKGROUND 3D printing is dramatically changing the manufacturing landscape. Via 3D printing, articles and components can be manufactured without the resources of a factory or other large scale production facility.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense. It is to be understood that features of the various examples described herein may be combined, in part or whole, with each other, unless specifically noted otherwise.

At least some examples of the present disclosure are directed to additively forming a 3D object. In some examples, a 3D object is additively formed via arranging non-conductive material relative to a receiving surface. During additive formation of the 3D object, a conductive channel is formed as part of the 3D object.

In some examples, the arranging of the non-conductive material and the conductive material is performed via a direct deposition process, such as but not limited to, fused deposition modeling (FDM), curable liquid photopolymer jetting (Polyjet), etc. In some examples, the arranging of the non-conductive material and the conductive material is performed via a selective solidification process, such as but not limited to, selective laser sintering (SLS), selective laser melting (SLM), 3D binder jetting, multi-jet fusion (MJF), etc. However, it will be understood that in some examples the arranging can be performed via other processes or via additional processes.

In some examples, spaced apart portions of the conductive channel are exposed on an exterior surface of the 3D object. In some examples, these exposed spaced apart portions comprise the ends of the conductive channel. However, in some examples, the spaced apart portions of the conductive channel are not exposed on an exterior surface of the 3D object.

In examples in which the spaced apart portions are exposed, they are accessible for releasable connection to a measurement device to perform fracture sensing based on a measured electrical parameter of the conductive channel. In some examples, the electrical parameter comprises a resistance of the conductive channel, such that a fracture which has occurred or is occurring through the 3D object, including the conductive channel, will cause a significant change in the measured resistance.

In some examples, via such additive formation the conductive channel is embedded internally within the non-conductive material of 3D object. In one aspect, such embedding can protect the conductive channel from corrosive environments and/or enhance an appearance of the 3D object by concealing the conductive channel. In some examples in which the spaced apart portions of the conductive channel are not exposed on an exterior surface of the 3D object, additional conductive elements may be formed within the 3D object to facilitate connection to measurement devices to determine an electrical parameter of the conductive channel. By forming a conductive channel within a 3D object, the 3D object contains an on-board capability for fracture sensing, thereby avoiding the complexity and/or poor appearance involved in later adding fracture sensing components to an exterior surface of a 3D object.

In some examples, a conductive channel is incorporated into a 3D object in the regions of the 3D object which may be at more risk for fracture, and therefore in such examples, the conductive channel(s) is not present throughout every portion of the 3D object.

In some examples, the 3D object comprises a separable component of a larger assembly. In some such examples, the conductive channel may extend through a length or width of the entire 3D object.

In some examples, the additive formation occurs via forming successive layers via a single pass per layer (e.g. page-wide arrangement) as the arranging mechanism moves in a first orientation (e.g. horizontal). In some examples, both conductive and non-conductive materials are arranged as part of a single layer.

In some examples, the additive formation occurs via forming at least one single layer via multiple passes. In some such examples, both the conductive and non-conductive materials are arranged as part of the at least one single layer.

In some instances, to the extent that a non-conductive body of a 3D object may experience stress due to external forces, corrosion, wear, etc., the 3D object may immediately break or break over a period of time (e.g. fatigue failure due to cyclic loads) before a final failure occurs. In many instances, prior to such final failure, an initial partial fracture occurs and an ensuing crack may develop.

In some examples, such cracks may develop along the connection between successive layers (i.e. a layer connection) of the 3D object. Accordingly, in some examples, the conductive channel is formed (as part of the 3D object) to extend in a second orientation (e.g. vertical) generally perpendicular to the first orientation such that a crack propagating along such a layer connection may cause a fracture in the conductive channel. Such fractures can enable one to detect a change in an electrical parameter (e.g. resistance, etc.) in the conductive channel.

Via such arrangements, non-destructive fracture sensing may be performed on a 3D object formed primarily of non-conductive materials. The fracture sensing may be performed continuously (e.g. real time) or intermittently.

These examples, and additional examples, are described in association with at least FIGS. 1-11.

Figure 1:
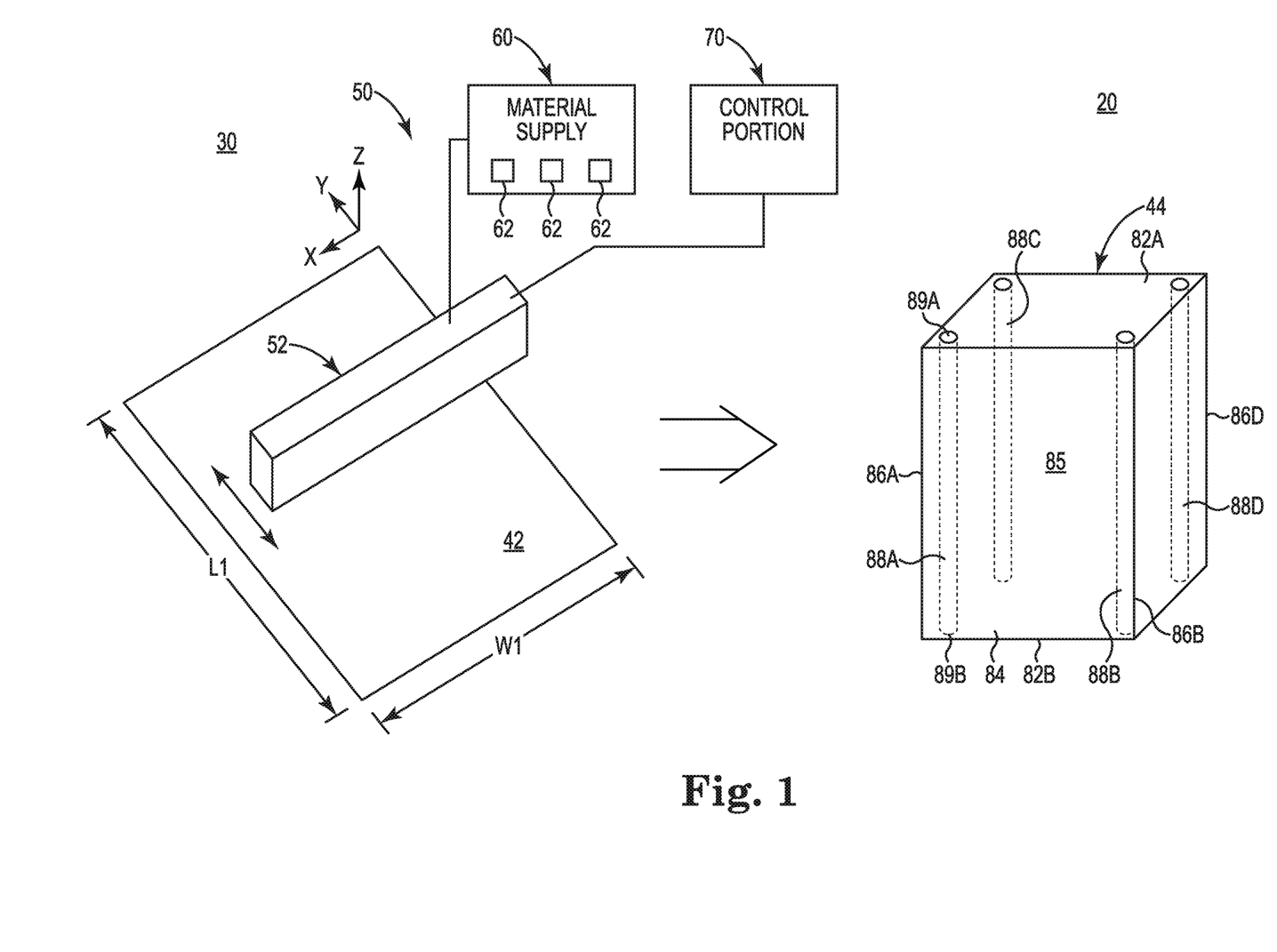
FIG. 1 is a diagram including a perspective view schematically representing a device for additive manufacturing and an additively formed 3D object including conductive channels, according to one example of the present disclosure.

FIG. 1 is a diagram schematically representing a device 30 for manufacturing a 3D object, according to one example of the present disclosure.

As shown in FIG. 1, device 30 comprises an arranging mechanism 50 to arrange materials from a material supply 60 onto a receiving surface 42 to additively form a 3D object, such as cube 44. It will be understood that a 3D object of any shape can be manufactured, and that the cube 44 provides just one example shape.

In some examples, device 30 provides a general representation of various types of direct deposition devices and/or processes to perform additive manufacturing, such as fused deposition modeling (FDM), curable liquid photopolymer jetting (Polyjet), stereolithography (SLA), etc. In some instances device 30 may sometimes be referred to as a 3D printer to refer to its ability to additively manufacture 3D objects.

In some examples, the arranging mechanism 50 comprises a dispenser 52 to arrange the material relative to the receiving surface 42. In some examples, the dispenser 52 comprises a single nozzle for extruding or otherwise placing the material relative to the receiving surface 42. In some examples, dispenser 52 may comprises multiple nozzles or extruders.

In some examples, the dispenser 52 comprises a printing mechanism, which comprises an array of printheads, each including a plurality of individually addressable nozzles for selectively ejecting material onto receiving surface 42.

In some examples, the dispenser 52 arranges material onto an entire width (W1) of the receiving surface 42, and therefore may sometimes be referred to as providing page-wide manufacturing (e.g. page wide printing). In some examples, via this arrangement the dispenser 52 can arrange material onto the entire receiving surface in a single pass as the dispenser 52 travels the length (L1) of the receiving surface 42.

It will be further understood that a 3D object additively formed via device 30 may have a width and/or a length less than a width (W1) and/or length (L1) of the receiving surface 42.

In one aspect, in some examples, once formed the 3D object is separate from, and independent of, the receiving surface 42.

In some examples, material supply 60 comprises an array of reservoirs 62 to contain various materials, such as but not limited to, non-conductive materials, conductive materials, etc. In some examples, the non-conductive materials include polymers, ceramics, etc., as further described later in association with at least FIG. 4.

As such, it will be further understood that in some examples, additional arranging mechanisms 50 may be present in device 30 for arranging material in an orientation (direction Y) transverse to the orientation (direction X) traveled by the arranging mechanism 50 shown in FIG. 1.

In at least some examples, the additive manufacturing process is performed without subtractive processes, such as machining, etching, etc.

In some examples, the entire additively formed 3D object is solid, while in some examples, just portions of the 3D object are solid. In some examples, the entire 3D object or portions of the 3D object are hollow, i.e. formed as wall(s) which together define a hollow interior space.

As shown in FIG. 1, in some examples device 30 includes and/or operates in cooperation with a control portion 70 to implement the additive formation of the 3D object. In some examples, the control portion 70 comprises at least some of substantially the same features and attributes as control portion 200, as later described in association with at least FIG. 4A.

As further shown in FIG. 1, in some examples the 3D object 44 additively formed via device 30 includes a body 85 of non-conductive material extending between a top end 82A and an opposite bottom end 82B and defining four faces 84. The 3D object 44 also includes a plurality of conductive channels 88A-88D which were embedded within body 45 during additive formation of the 3D object. Each conductive channel 88A-88D includes opposite ends 89A, 89B.

In the example implementation shown in FIG. 1, the conductive channels 88A-88D are located closely adjacent the corner edges 86A-86D of the cube-shaped 3D object. Via this arrangement, the conductive channels 88A-88D provide a structure by which a crack or fracture at any particular corner edge 86A-86D can be quickly and reliably detected.

While FIG. 1 illustrates a plurality of conductive channels embedded within the non-conductive body of the 3D object, in some examples, the 3D object can include just a single conductive channel. Moreover, as further described later in association with at least FIG. 4, when a plurality of conductive channels are present, the various conductive channels may have different shapes, sizes, locations. In other words, the respective conductive channels may not necessarily have the same shape, size, location, etc.

While not shown in FIG. 1, it will be understood that in some examples at least a portion of a conductive channel(s) other than the opposite ends may be exposed at an exterior surface of the 3D object.

Figure 2:
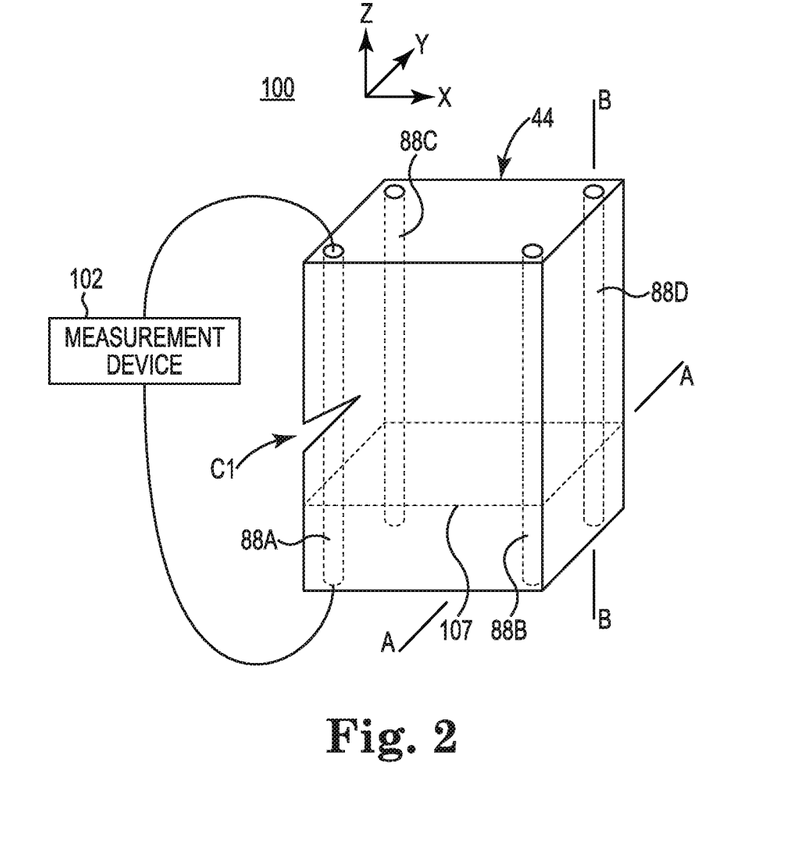
FIG. 2 is a perspective view schematically representing a 3D object including conductive channels and exhibiting a crack, according to one example of the present disclosure.

FIG. 2 is a diagram 150 including a perspective view schematically representing 3D object 44 from FIG. 1, except exhibiting a crack C2, according to one example of the present disclosure. As shown in FIG. 2, the 3D object 44 exhibits a crack C2 formed at a corner edge 86A and extending into the non-conductive body 45 and through the closely adjacent conductive channel 88A. Leads 153 associated with a measurement device 152 are releasably connected to the exposed ends 89A, 89B of conductive channel 88A, thereby enabling measurement of an electrical parameter (e.g. resistance) of the conductive channel. In some examples, the measurement is performed by applying a small voltage to the leads 153 and determining a current response, which is then analyzed and compared to available references, thresholds, etc. Upon a fracture in the conductive channel, at least some aspects of the current response will be changing either discretely or even continuously. One aspect observable via the current response, which is indicative of fracture, is resistance.

Given the complete break in the conductive channel 88A due to the crack C1, a very large or an infinite resistance is measured, thereby indicating propagation of the crack C1 into and through at least a portion of the interior of the non-conductive body 45 of the 3D object.

In some examples, measurement device 152 omits use of leads and includes a probe which is directly, releasably insertable into or near a crack for checking a continuity of a conductive channel, and thereby indicating the presence of or extent of a fracture.

FIG. 2 further illustrates a plane (represented by dashed lines 157) representing one layer connection of the additively formed 3D object extending in a first orientation (e.g. horizontal) as indicated by lines A-A. Meanwhile, each conductive channel 88A-88D is formed to extend in a second orientation (e.g. vertical) generally perpendicular to the first orientation. Via this arrangement, the conductive channels are positioned to intercept crack propagation along a layer connection such that the crack would be expected to pass through the conductive channel and cause a change in a measurable electrical parameter (e.g. resistance) of the conductive channel.

Figures 3A, 3B:
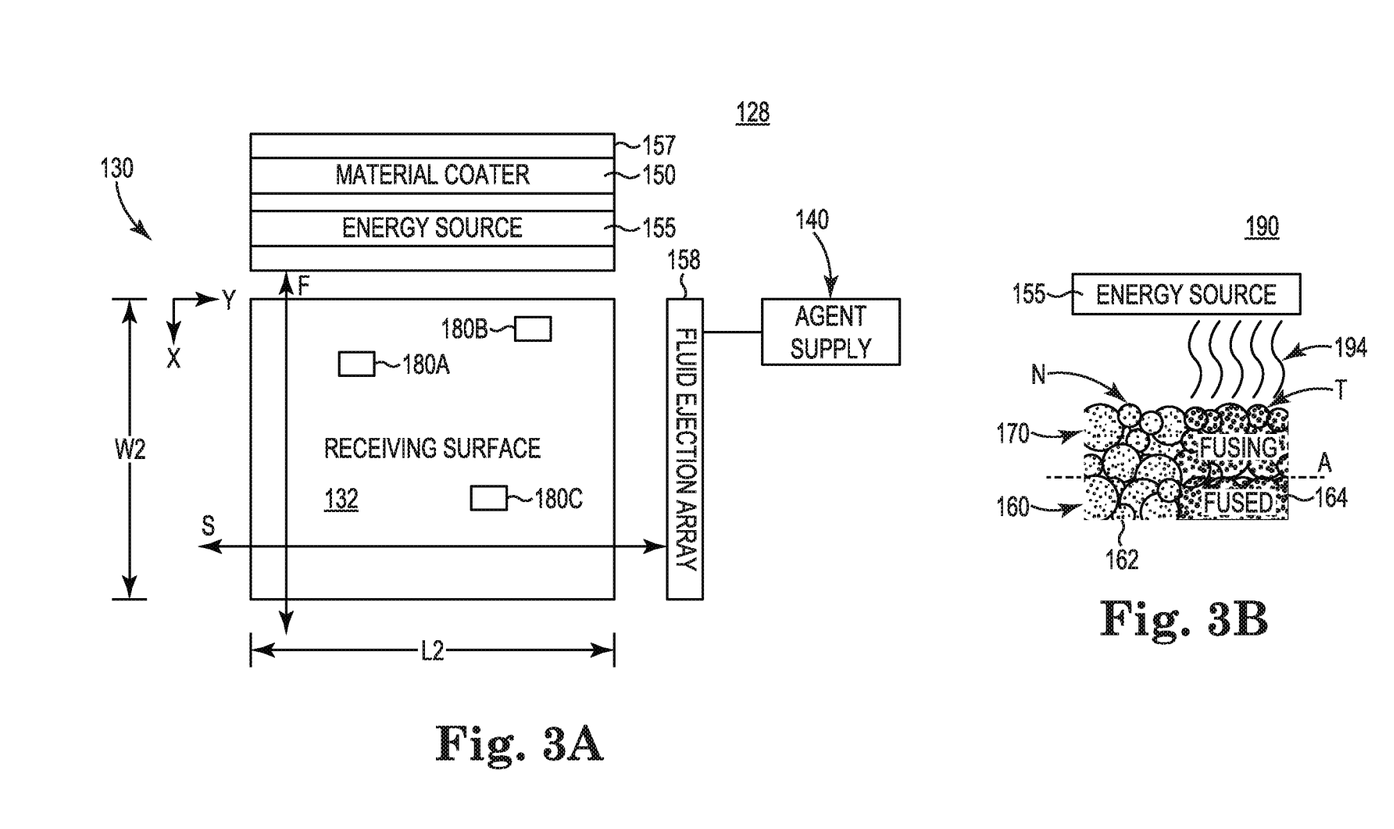
FIG. 3A is a block diagram including a top view schematically representing a device to additively manufacture a 3D object, according to one example of the present disclosure.
FIG. 3B is a diagram including a side view schematically representing application of energy during additive manufacturing of a 3D object, according to one example of the present disclosure.

FIG. 3A is a block diagram including a top view schematically representing an arranging mechanism 128 including a device 130 to additively manufacture a 3D object, according to one example of the present disclosure. As shown in FIG. 3A, in some examples device 130 comprises a material coater 150 arranged to place a coating of materials onto a receiving surface 132 to additively form a 3D object, such as object 44 in FIG. 1. In some examples, the device 130 is representative of at least some types of selective solidification devices, which provide one example implementation of an arranging mechanism to additively manufacture a 3D object. One such selective solidification device includes a MultiJet Fusion (MJF) process (available from HP, Inc.). In some examples, the arranging mechanism 128 comprises other types of selective solidification devices to perform additive formation of a 3D object, such as selective laser sintering (SLS), selective laser melting (SLM), 3D binder printing (e.g. 3D binder jetting), stereolithography (SLA).

In some examples, the device 130 includes a material coater 150 and an energy source 155 as shown in FIG. 3A.

In some examples, the material coater 150 has a length (L2) sufficient to coat materials onto an entire length (L2) of the receiving surface 132, such that the material coater 150 is capable of coating the entire receiving surface in a single pass as the material coater 150 travels the width (W2) of the receiving surface 132. In some examples, the material coater 150 can selectively coat material in lengths and patterns less than a full length of the material coater 150.

In some examples, the material coater 150 moves in a first orientation (represented by directional arrow F). In some examples, the material coater 150 can deposit material in each pass of a back-and-forth travel path along the first orientation.

As further shown in FIG. 3A, device 130 includes an energy source 55 for irradiating the coating of materials to cause heating of the material, which may in turn result in fusing of particles of the material relative to each other, with such fusing occurring via melting, sintering, etc. In some examples, the energy source 155 can selectively direct its energy emissions to selectively heat targeted portions of the layer of material on receiving surface 132 (or previous layers of material). Doing so results in selective fusing or other solidification of the targeted portions.

FIG. 3B is a diagram 190 including a side view schematically representing application of energy during additive manufacturing of a 3D object, according to one example of the present disclosure. As shown in FIG. 3C, via energy source 155, energy 194 is applied onto the second layer 170 of material, thereby resulting in fusing of the particles of the material in the target portion T. Meanwhile, as further shown in FIG. 3C, the non-target portion (N) is not fused or otherwise solidified because energy was not applied at that location.

In some examples, in addition to material coater 150 and energy source 155, the device 130 of arranging mechanism 128 comprises a fluid ejection array 158 and an agent supply 140. In general terms, the fluid ejection array 158 selectively deposits agents onto a layer of material to facilitate fusing the material, to add color to the material, and/or otherwise modify a quality of the material.

In some examples, such agents are selectively deposited onto a layer of material prior to application of energy via energy source 155.

In some examples, the fluid ejection array 158 comprises a printing mechanism, which comprises an array of printheads, each including a plurality of individually addressable nozzles for selectively ejecting agents onto receiving surface 132, as shown in FIG. 3A. It will be understood that in instances in which a material layer(s) already exists on the receiving surface 132, the droplets are deposited on such material layer instead of directly onto receiving surface 132.

In some examples, fluid ejection array 158 comprises a thermal inkjet array. In some examples, the fluid ejection array 158 may eject individual droplets having a volume on the order of ones of picoliters or on the order of ones of nanoliters.

In some examples, as shown in FIG. 3A the fluid ejection array 158 moves in a second orientation (represented by directional arrow S) generally perpendicular to the first orientation (F). In some examples, the fluid ejection array 158 can deposit agents in each pass of a back-and-forth travel path along the second orientation. In some examples, one pass is completed by the material coater 150, followed by a pass of the fluid ejection array 58 before a second pass of the material coater 150 is initiated, and so on.

In some examples, the selective depositing of droplets is made on a voxel-by-voxel basis. A voxel is a volumetric pixel, i.e. volumetric picture element. In some examples, a resolution of 1200 voxels per inch is implemented via fluid ejection array 58.

In some examples, the fluid ejection array 158 has a width (W2) capable of depositing agents onto an entire width (W2) of the receiving surface 42, and therefore may sometimes be referred to as providing page-wide manufacturing (e.g. page wide printing). In such examples, via this arrangement the fluid ejection array 158 can deposit agents onto the entire receiving surface in a single pass as the fluid ejection array 158 travels the length (L2) of the receiving surface 132.

However, it will be understood that the fluid ejection array 158 includes individually addressable nozzles to permit selective ejection of droplets at target portions on receiving surface 132, such as target portions 180A, 180B, 180C shown in FIG. 3A. It will be further understood that the size, quantity, and/or shape of portions 180A-180C as shown in FIG. 3A are merely representative and that other sizes, quantities, and/or shapes of target portions may be implemented.

It will be further understood that a 3D object additively formed via device 130 may have a width and/or a length less than a width (W2) and/or length (L2) of the receiving surface 132. In one aspect, in some examples, once formed the 3D object is separate from, and independent of, the receiving surface 132.

In some examples, agent supply 140 of device 130 is in fluid communication with fluid ejection array 158 and comprises an array of reservoirs to contain various agents, such as but not limited to, detailing agents, fusing agents, coloring agents, etc. As previously mentioned, at least some of the agents can facilitate heating of at least selected portions of a material layer to induce fusing, such as via melting, sintering, etc.

In at least some examples, the additive manufacture manufacturing process is performed in association with device 130 (FIG. 3A) without subtractive manufacturing processes, such as machining, etching, etc.

In some examples, in a manner substantially similar to that of device 30 in association with FIG. 1, device 130 includes and/or operates in cooperation with a control portion (70 in FIG. 1) to implement the additive formation of the 3D object. In some examples, the control portion 70 (FIG. 1) comprises at least some of substantially the same features and attributes as control portion 200, as later described in association with at least FIG. 4A.

Figures 4A, 4B:
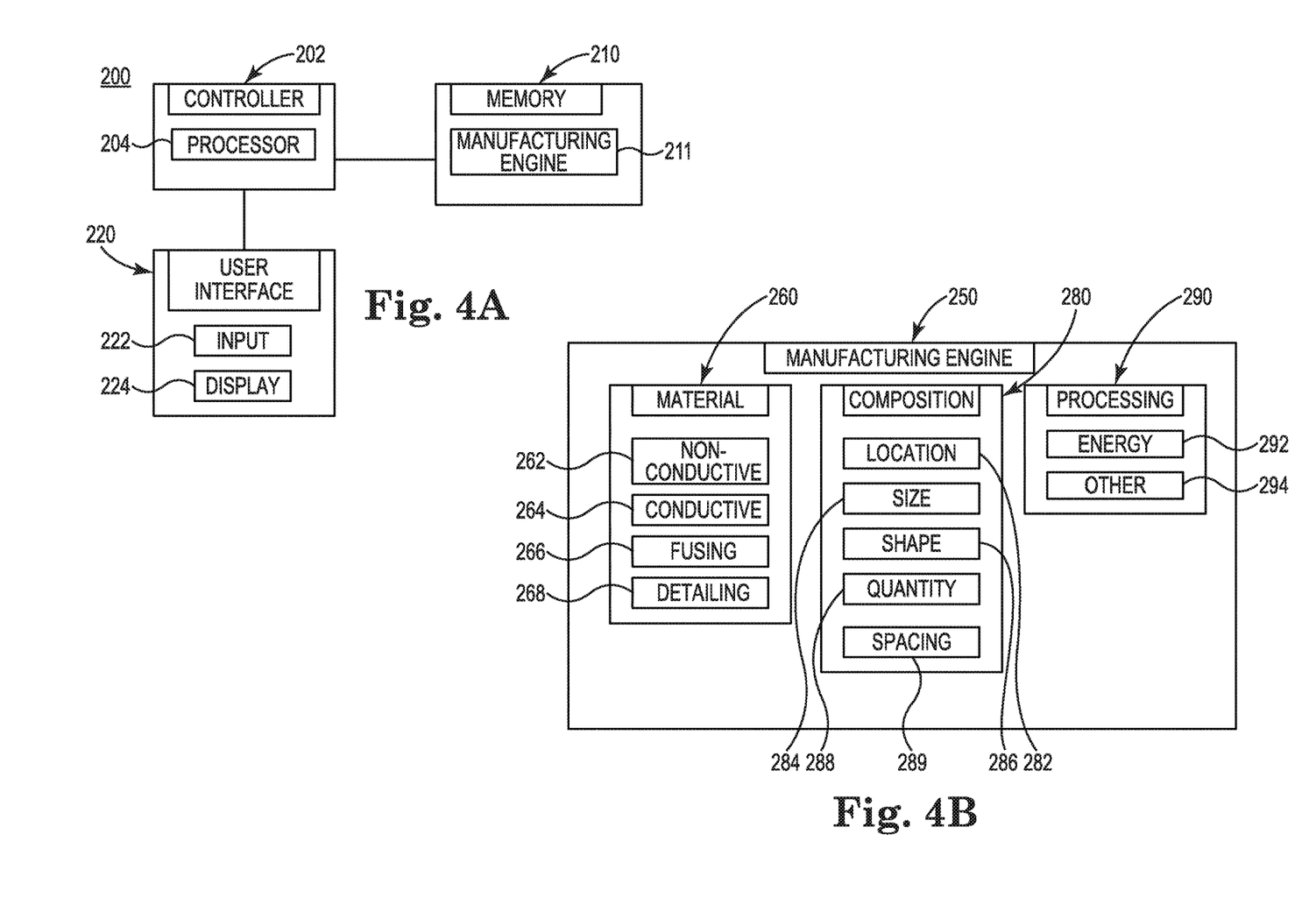
FIG. 4A is a block diagram schematically representing a control portion, according to one example of the present disclosure.
FIG. 4B is a block diagram schematically representing a manufacturing engine, according to one example of the present disclosure.

FIG. 4A is a block diagram schematically representing a control portion 200, according to one example of the present disclosure. In some examples, control portion 200 comprises one example implementation of control portion 70 in FIG. 1. In some examples, control portion 200 comprises at least some of substantially the same features and attributes of control portion 70 in association with FIG. 1.

In some examples, control portion 200 provides one example implementation of a control portion forming a part of, implementing, and/or managing any one of devices, arranging mechanisms, material supply, managers, engines, functions, parameters, measurement devices, and/or methods, as represented throughout the present disclosure in association with FIGS. 1-2 and 4B-11.

In some examples, control portion 200 includes a controller 202 and a memory 210.

In general terms, controller 202 of control portion 200 comprises at least one processor 204 and associated memories. The controller 202 is electrically couplable to, and in communication with, memory 210 to generate control signals to direct operation of at least some the devices, arranging mechanisms, material supply, managers, engines, functions, parameters, measurement devices, and/or methods, as represented throughout the present disclosure. In some examples, these generated control signals include, but are not limited to, employing manufacturing engine 211 stored in memory 210 to at least direct and manage additive formation of 3D objects including at least some conductive channels in the manner described in at least some examples of the present disclosure.

In response to or based upon commands received via a user interface (e.g. user interface 220 in FIG. 4A) and/or via machine readable instructions, controller 202 generates control signals to implement additive formation of 3D object in accordance with at least some of the examples of the present disclosure. In some examples, controller 202 is embodied in a general purpose computing device while in some examples, controller 202 is incorporated into or associated with at least some of the associated devices, arranging mechanisms, material supply, managers, engines, functions, parameters, measurement devices, and/or methods etc. described throughout the present disclosure.

For purposes of this application, in reference to the controller 202, the term "processor" shall mean a presently developed or future developed processor (or processing resources) that executes sequences of machine readable instructions contained in a memory. In some examples, execution of the sequences of machine readable instructions, such as those provided via memory 210 of control portion 200 cause the processor to perform actions, such as operating controller 202 to implement additive formation of 3D objects as generally described in (or consistent with) at least some examples of the present disclosure. The machine readable instructions may be loaded in a random access memory (RAM) for execution by the processor from their stored location in a read only memory (ROM), a mass storage device, or some other persistent storage (e.g., non-transitory tangible medium or non-volatile tangible medium), as represented by memory 210. In some examples, memory 210 comprises a computer readable tangible medium providing non-volatile storage of the machine readable instructions executable by a process of controller 202. In other examples, hard wired circuitry may be used in place of or in combination with machine readable instructions to implement the functions described. For example, controller 202 may be embodied as part of at least one application-specific integrated circuit (ASIC). In at least some examples, the controller 202 is not limited to any specific combination of hardware circuitry and machine readable instructions, nor limited to any particular source for the machine readable instructions executed by the controller 202.

In some examples, control portion 200 is entirely implemented within or by a stand-alone device, which has at least some of substantially the same features and attributes as device 30 (FIG. 1), 130 (FIG. 3A) as previously described in association with at least FIGS. 1-2. In some examples, the control portion 200 is partially implemented in the device 30 (FIG. 1), 130 (FIG. 3A) and partially implemented in a computing resource separate from, and independent of, the device 30 (FIG. 1), 130 (FIG. 3A) but in communication with the device 30 (FIG. 1), 130 (FIG. 3A).

In some examples, control portion 200 includes a user interface 220 as shown in FIG. 4A. In some examples, user interface 220 comprises a user interface or other display that provides for the simultaneous display, activation, and/or operation of at least some of the devices, arranging mechanisms, material supply, managers, engines, functions, parameters, measurement devices, and/or methods, as described in association with FIGS. 1-2 and 4B-11. In some examples, at least some portions or aspects of the user interface 220 are provided via a graphical user interface (GUI), and may comprise a display 224 and input 222.

FIG. 4B is a block diagram schematically representing a manufacturing engine 250, according to one example of the present disclosure. In some examples, manufacturing engine 250 provides one example implementation of manufacturing engine 211 in control portion 200 in FIG. 4A. In some examples, control portion manufacturing engine 250 comprises at least some of substantially the same features and attributes of manufacturing engine 211 in association with FIG. 4A.

As shown in FIG. 4B, in some examples, manufacturing engine 250 comprises a material engine 260, a composition engine 280, and/or a processing engine 290.

In some examples, the manufacturing engine 250 directs and manages formation of a 3D object, including arranging electrically non-conductive material relative to a receiving surface to additively form a monolithic three-dimensional (3D) object. Via engine 250, such arrangement during additive formation of the 3D object also includes depositing electrically conductive material to form a first conductive channel extending internally within the electrically non-conductive portion of the 3D object. In some examples, opposite ends of the channel are exposed at spaced apart locations on an exterior surface of the 3D object.

In general terms, the material engine 260 enables the selection (automatically or manually) of materials to be arranged onto a receiving surface. In some examples, the material engine 260 comprises a non-conductive material parameter 262, a conductive material parameter 264, a fusing agent parameter 266, and/or a detailing agent parameter 268.

Via the non-conductive material parameter 262, the manufacturing engine 211 specifies which non-conductive material(s) and the quantity of such materials which can be used to additively form a body of the 3D object. The non-conductive materials may comprise polymers, ceramics, composites, etc. having sufficient strength, formability, toughness, etc. for the intended use of the 3D object.

Via the conductive material parameter 264, the manufacturing engine 250 specifies which conductive material(s) are used to form the conductive channels (e.g. 88A-88D in FIGS. 1-2). In some examples, the materials from conductive channels may comprise conductive inks, conductivity-transforming agents, conductive wires, conductive metals, etc. as well as combinations of such conductive materials. In some examples, the conductive materials may have a conductivity less than a conductivity threshold ordinarily associated with conducting an electrical signal because the conductive channel is not necessarily intended to convey a signal. In other words, when formed into a conductive channel (e.g. 88A-88D) the conductive materials have enough conductivity to exhibit a resistance such that when a crack or complete fracture of the conductive channel occurs, the change in resistance (or other electrical parameter) is measurable and therefore indicative of crack formation and/or propagation. Accordingly, a broad range of conductive materials may be used.

In some examples, the detailing parameter 268 controls deposition of a detailing agent to complement fusing of the deposited materials, while the fusing parameter 266 controls deposition of a supplemental fusing agent to facilitate fusing of the deposited materials into a monolithic structure. In some examples, other agents or additional agents are deposited selectively, such as but not limited to, coloring agents, etc.

It will be understood that the materials engine 260 is not limited to specifying the types of materials associated with parameters 262-268 shown in FIG. 4B, but instead may specify any type of material conducive to additively forming a 3D object, with such type of materials depending on the size, type, shape, use, etc. of the 3D object, and depending on the particular type of method used to perform the additive formation of the 3D object.

The various materials used to additively form the 3D object can take any one of several forms, such as but not limited to, powders, liquids, filaments, etc.

Each of the different respective types of materials can be contained separately in different reservoirs (e.g. 62 in FIG. 1) of a material supply station 60 and selectively drawn as desired during the additive formation of the 3D object.

In general terms, the composition engine 280 of manufacturing engine 250 comprises enables the selection (automatically or manually) of attributes by which the selected materials are deposited. For instance, in some examples the composition engine 280 comprises a location parameter 282, a size parameter 284, a shape parameter 286, a quantity parameter 288, and a spacing parameter 289. The location parameter 282 can specify a location at which the various materials and/or a structure defined by such materials is located. For instance, the location parameter 282 can specify a location at which a conductive channel(s) (e.g. 88A-88D) is formed relative to the surrounding non-conductive material defining a body 45 of the 3D object 44. Meanwhile, the size parameter 284 can specify a size of each conductive channel(s) being formed. The size can be specified as an absolute quantity or as a relative quantity, i.e. a size of the conductive channel relative to a size or volume of the surrounding non-conductive material defining a body of the 3D object.

In some examples, the shape parameter 286 enables specifying a shape of the conductive channel(s), which can be absolute or relative to the general shape of the 3D object in which the conductive channel is embedded.

In some examples, the quantity parameter 288 enables specifying a quantity of conductive channels embedded within a 3D object.

In some examples, the spacing parameter 289 can specify the spacing of conductive channels (within 3D object) relative to each other and/or can specify the spacing of a respective conductive channel relative to an exterior surface or edge of the non-conductive body of the 3D object.

In general terms, the processing engine 290 of manufacturing engine 250 enables specifying various processing steps on the deposited materials, such as applying energy via energy function 292 to cause mixing, fusing, etc. of the deposited materials.

Meanwhile, in some examples, other or additional processing steps may be performed as indicated by other function 294.

Figure 5A:
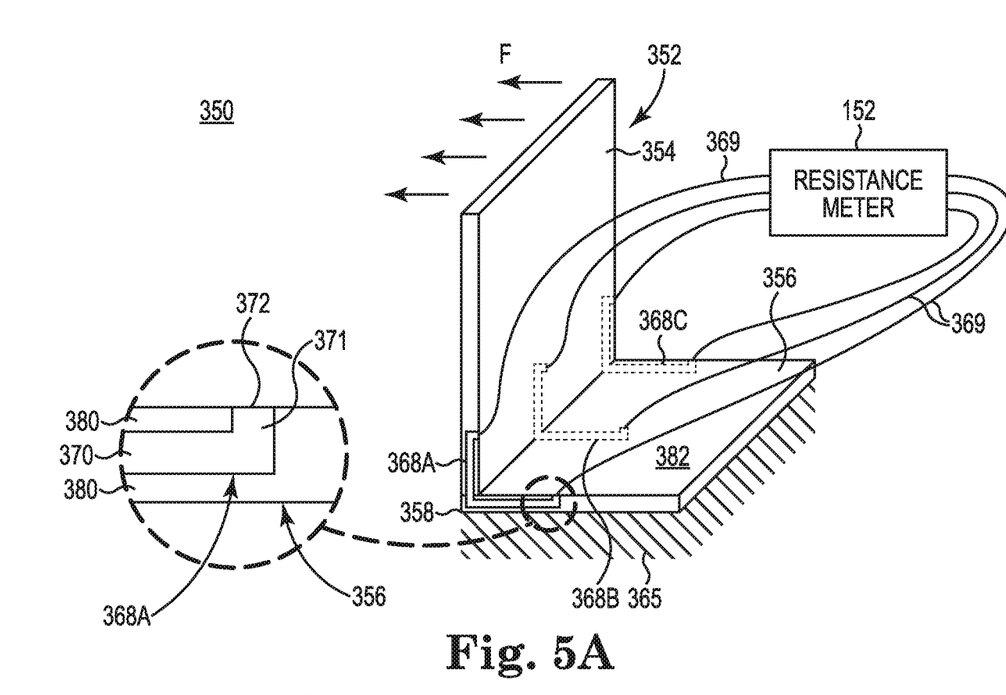
FIG. 5A is a diagram including a perspective view schematically representing a 3D object including conductive channels and a measurement device, according to one example of the present disclosure.

FIG. 5A is a diagram 350 including a perspective view schematically representing a measurement device 152 and a 3D object 352 including conductive channels 368A-368C, according to one example of the present disclosure. As shown in FIG. 5A, the 3D object 352 includes a first portion 354 and a second portion 356, which together form an angle relative to each other. In the illustrated example, the angle is 90 degrees. However, it will be understood that in some examples, the angle can be less than 90 degrees or more than 90 degrees. A corner edge is formed at the junction 358 of the respective first portions 354 and 356. While the first and second portions 354, 356 are shown as having a wall-like or sheet-like shape in FIG. 5A, it will be understood that in some examples, the first portion and/or second portion 354, 356 can have other shapes while still forming an angle therebetween.

As further shown in FIG. 5A, the second portion 356 can be secured to a base 365, while the first portion 354 may be subject to force F, which in turn places stress at/along junction 358.

Accordingly, as shown in FIG. 5A, conductive channels 368A-368B are embedded in non-conductive body of the 3D object 352 to enable sensing fractures in and around junction 358. In particular, each conductive channel 368A-368C includes a first segment 363A and a second segment 363B (FIG. 5B), with first segment 363A embedded within first portion 354 and second segment embedded within second portion 356. Via this arrangement, a crack or fracture developing along the junction 358 can be detected upon the crack at least partially separating first segment 363A from second segment 363B of at least one of the respective conductive channels 368A-368C.

In some examples, this separation is detectable via a measurement device 152 by which an electrical parameter of the respective conductive channels 368A-368B is measured using leads 369 releasably connected to the ends of the respective conductive channels 368A-368C. In some examples, the electrical parameter comprises resistance, while in some examples, the electrical parameter comprises other electrical characteristics identifiable via a current response waveform.

Figure 5B:
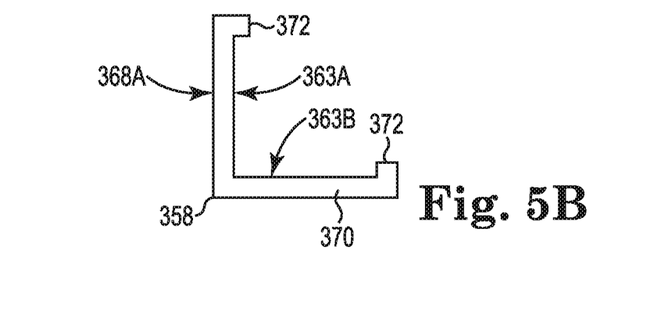
FIG. 5B is a side view schematically representing a conductive channel, according to one example of the present disclosure.

A more detailed view of one example implementation of one of the conductive channels (e.g. 368A) is shown in the breakout view in FIG. 5. As shown in this view, a main portion 370 of the conductive channel 368A extends in orientation generally parallel to a plane through which whole second portion 356 extends. Meanwhile, an extension portion 371 of the conductive channel 368A extends from the main portion 370 at a 90 degree angle, resulting in an end 372 of the conductive channel 368A being exposed at top exterior surface 382 of second portion 356.

In some examples, this arrangement is representative of a manner in which the ends 372 of the other respective conductive channels 368B, 368C are exposed at an exterior surface 382 of the 3D object.

Figure 6:
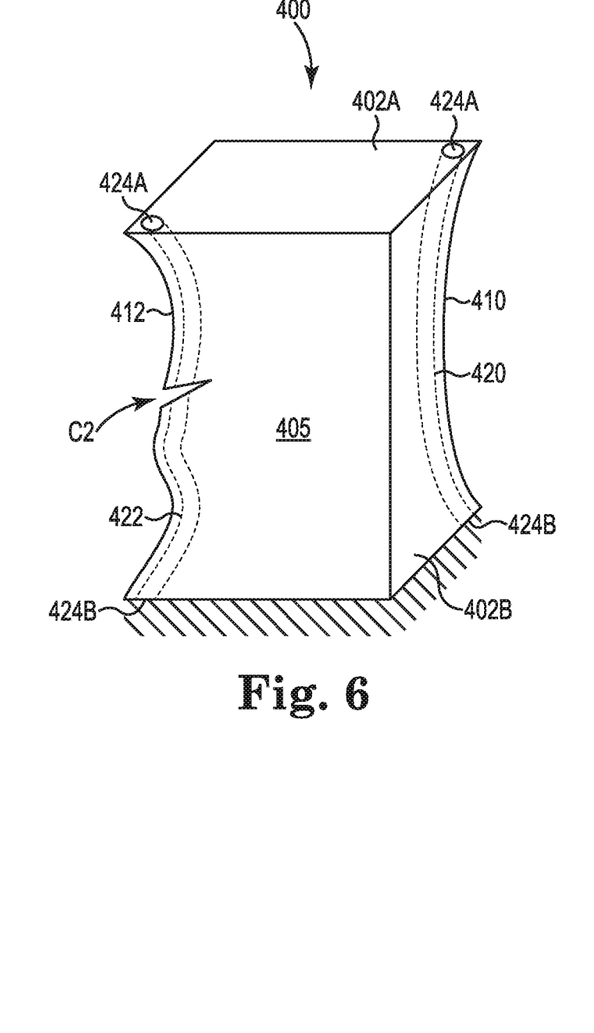
FIG. 6 is a perspective view schematically representing a 3D object having at least some non-linear surfaces and including conductive channels, according to one example of the present disclosure.

FIG. 6 is a perspective view schematically representing a 3D object 400 having at least some nonlinear surfaces and embedded conductive channels, according to one example of the present disclosure. As shown in FIG. 6, 3D object 400 includes a first end 402A and an opposite second end 402B with non-conductive body 405 extending therebetween. As further shown in FIG. 6, at least some of the exterior surfaces of the 3D object are additively formed with a non-linear shape, such as the undulating corner edge 412 and/or the generally single curvature corner edge 410. A conductive channel 420 generally corresponding to the shape of the single curvature corner edge 410 extends alongside, and follows the contour of, the single curvature corner edge 410. Meanwhile, a conductive channel 422 generally corresponding to the shape of the undulating-shaped corner edge 412 extends alongside, and follows the contour of, the undulating-shaped corner edge 412.

In this way, the conductive channels 420, 422 may sometimes be referred to as mimicking the contour (e.g. conforming to) of the corner edges 410, 412.

In their embedded position, each conductive channel 420, 422 is spaced apart inwardly from the respective corner edge 410, 412 with just the ends 424A, 424B of the respective channels 420, 422 being exposed at the ends (e.g. exterior surface) of the 3D object for releasable connection to a measurement device.

It will be further understood that a non-linear surface or corner edge (and an associated conductive channel) of a 3D object can have shapes and configurations other than that shown in FIG. 6. For instance, a nonlinear surface or edge may include portions which are convex or concave, as well as portions which are recessed or protruding, or even have portions exhibiting both convexity and concavity or both recesses and protrusions. In some instances, the nonlinear surface or edge is not curved but exhibits other shapes. Moreover, the shape variations may differ from one side (e.g. face) of the 3D object from another side or portion of the 3D object.

Figure 7:
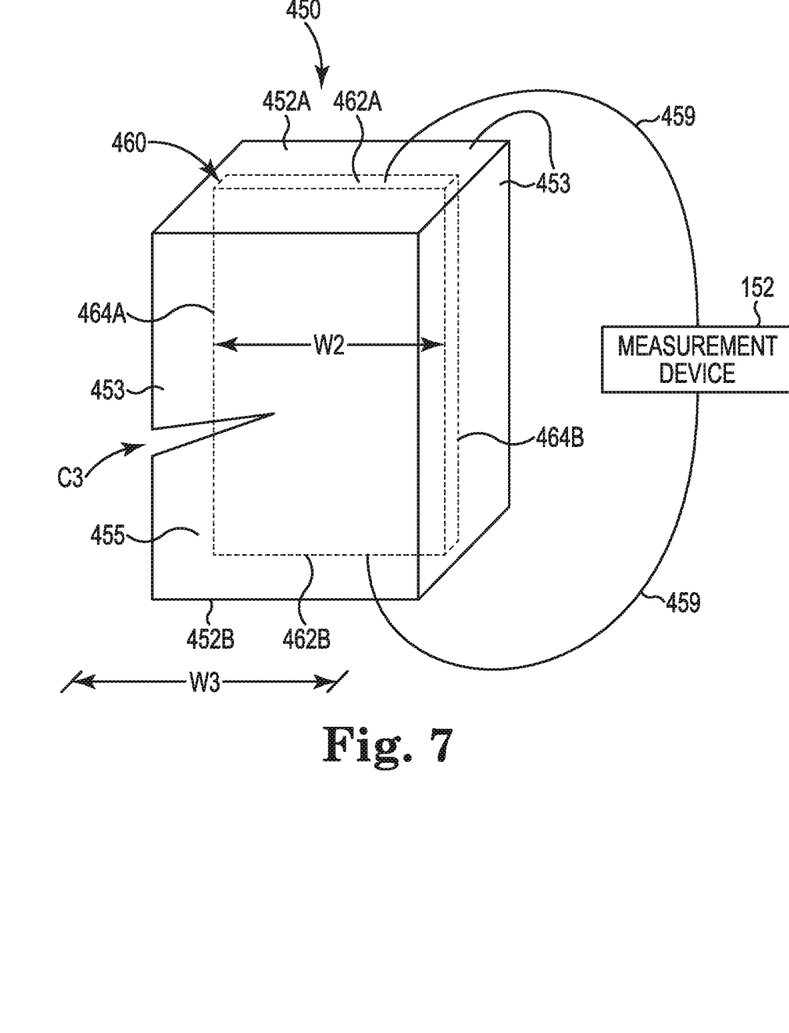
FIG. 7 is a perspective view schematically representing a measurement device and a 3D object including a conductive sheet, according to one example of the present disclosure.

FIG. 7 is a perspective view schematically representing a measurement device and a 3D object 450 including conductive sheet 460, according to one example of the present disclosure. As shown in FIG. 7, 3D object 450 includes a top end 452A and an opposite bottom end 452B with side faces 453 of non-conductive body 455. A conductive sheet 460 is embedded within body 455, extending from top end 452A to bottom end 452B of 3D object 450. Ends 462A, 462B of the conductive sheet 460 are exposed at the respective ends (i.e. exterior surface) of the body 455 to enable releasable connection of leads from measurement device 152. By providing an embedded conductive element in the form of a sheet that extends through a significant portion of the non-conductive body 455 of 3D object, a quantitative sensing of a crack or fracture can be obtained. For instance, as shown in FIG. 7, in some examples the conductive sheet 460 may have a width (W2), which may extend within or through at least a majority of a width (W3) of body 455. In some examples, the width (W2) may extend through substantially an entire width (W3) of body 455.

In one aspect, as a crack progresses the resistance (or other electrical parameter) of the conductive sheet 460 will increase such that periodic or continual monitoring can indicate a rate and/or extent of crack growth through body 455 of 3D object. In this way, quantitative fracture sensing can be performed.

Figure 8:
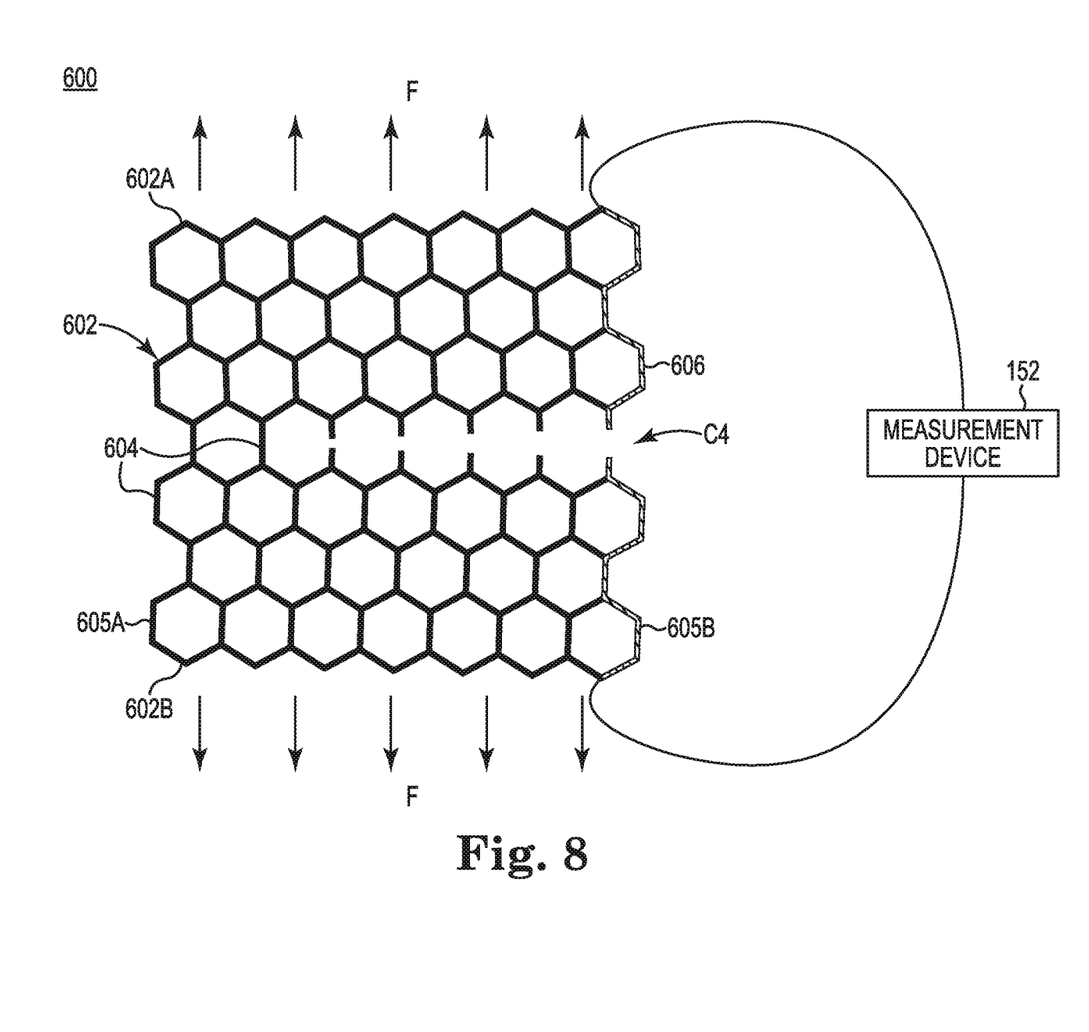
FIG. 8 is a perspective view schematically representing a 3D object in the form a lattice structure including a conductive channel, according to one example of the present disclosure.

FIG. 8 is a diagram 600 including a top view schematically representing a 3D object 602 comprising a lattice structure, according to one example of the present disclosure. The lattice structure defining the 3D object comprises a plurality of walls 604 with at least one such wall 606 comprising a conductive channel (identified by cross-hatching) extending between a first side 602A and a second side 602B of the lattice structure defining the 3D object.

Upon a crack (C4) initiating at wall 606 and propagating through walls 604 as shown in FIG. 8, a measurement device 152 can detect a fracture.

It will be understood that some interior walls of the lattice structure can be formed as conductive channels to facilitate fracture sensing. Moreover, to the extent that multiple walls are formed as conductive channels, a lattice structure can facilitate quantitative fracture sensing in a manner corresponding to quantitative fracture sensing associated with conductive sheet in association with FIG. 7.

In some examples, the lattice structure comprises a honeycomb pattern of interconnected walls as shown in FIG. 8. However, it will be understood that other types of lattice structures can incorporate a conductive channel (for fracture sensing) as at least one of the interconnected struts or members of the lattice structure.

Figures 9, 10:
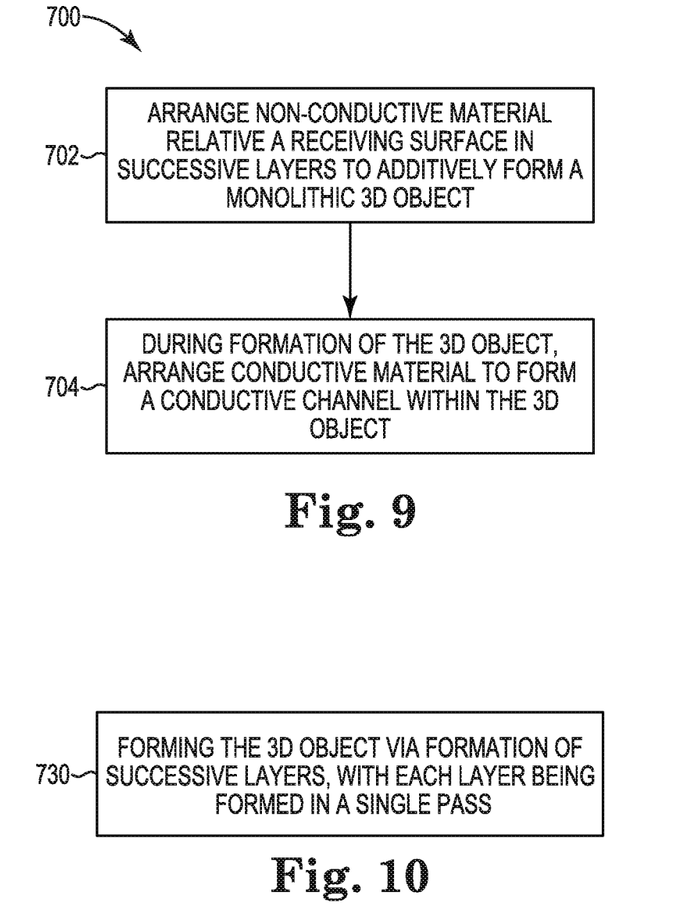
FIG. 9 is a flow diagram schematically representing a method of manufacturing a 3D object, according to one example of the present disclosure.
FIG. 10 is a flow diagram schematically representing an aspect of a method of manufacturing a 3D object, according to one example of the present disclosure.

FIG. 9 is a flow diagram schematically representing a method 700 of manufacturing a 3D object, according to one example of the present disclosure. In some examples, method 700 is performed via at least some of the arranging mechanisms, devices, engines, function, methods, as previously described in association with at least FIGS. 1-8. In some examples, method 700 is performed via at least some of the arranging mechanisms, devices, engines, function, methods other than those previously described in association with at least FIGS. 1-8. In particular, in some examples, method 700 is implemented via at least a manufacturing engine (211 in FIG. 3; 250 in FIG. 4).

As shown in FIG. 9, at 702 method 700 comprises arranging non-conductive material relative to a receiving surface to additively form a monolithic 3D object. At 704, method 700 comprises arranging, during formation of the 3D object, conductive material to form a conductive channel within the 3D object. In some examples, two spaced apart portions (e.g. ends) of the conductive channel exposed at an exterior surface of the 3D object.

FIG. 10 is a flow diagram schematically representing an aspect of a method 730 of manufacturing a 3D object, according to one example of the present disclosure. In some examples, the method 730 includes forming the 3D object via arranging successive layers of material, with each layer being formed in a single pass of a depositing mechanism.

Figure 11:
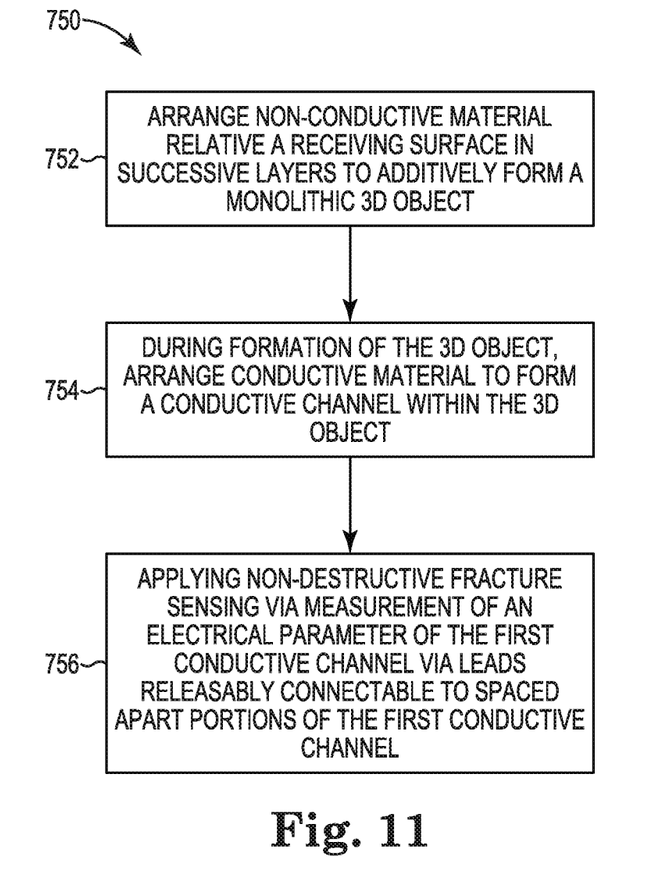
FIG. 11 is a flow diagram schematically representing a method of non-destructive fracture sensing, according to one example of the present disclosure.

FIG. 11 is a flow diagram schematically representing a method 750 of non-destructive fracture sensing, according to one example of the present disclosure.

In some examples, method 750 is performed via at least some of the arranging mechanisms, devices, engines, function, methods, as previously described in association with at least FIGS. 1-10. In some examples, method 750 is performed via at least some of the arranging mechanism, devices, engines, function, methods other than those previously described in association with at least FIGS. 1-10. In particular, in some examples, method 700 is implemented via at least a measurement device 152 as described in association with at least FIGS. 2, 5, and 7-8.

As shown in FIG. 11, at 752 method 750 comprises arranging electrically non-conductive material relative to a receiving surface to additively form a monolithic three-dimensional (3D) object. At 754, method 750 comprises arranging, during additive formation of the 3D object, electrically conductive material to form a first conductive channel extending internally within the electrically non-conductive portion of the 3D object. At 756, method 750 comprises applying non-destructive fracture sensing via measurement of an electrical parameter of the first conductive channel via leads releasably connectable to spaced apart portions of the first conductive channel.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein.

The invention claimed is:

1. A device including a processing resource to execute machine-readable instructions, stored in a non-transitory medium, to:
    arrange electrically non-conductive material relative to a receiving surface to additively form a monolithic three-dimensional (3D) object; and
    arrange, during additive formation of the 3D object, electrically conductive material to form a first conductive channel extending internally within the electrically non-conductive portion of the 3D object, wherein opposite ends of the first conductive channel are exposed at spaced apart locations on an exterior surface of the 3D object and to be releasably connectable to a measurement device to sense a fracture of the 3D object,
    wherein the arranging comprises arranging both the conductive and non-conductive materials as part of at least one of:
        a first single layer made via a single pass; and
        at least one second single layer made via multiple passes,
    wherein the instructions to form the 3D object includes instructions to form a 3D lattice work in which a plurality of spaced apart first walls of the 3D lattice work comprise the electrically non-conductive material and in which at least one second wall of the lattice comprises the first conductive channel made of the electrically conductive material, wherein the at least one second wall is spaced apart from at least one of the first walls.

2. The device of claim 1, the instructions to arrange the respective electrically non-conductive material and the electrically conductive material comprise instructions to at least one of:
    use selective solidification to form the 3D object including the first conductive channel; and
    use direct deposition to form the 3D object including the first conductive channel.

3. The device of claim 1, wherein the instructions to form the first conductive channel comprises instructions to:
    form a plurality of conductive channels, including the first conductive channel, spaced apart from each other within the non-conductive portion of the 3D object.

4. A device including a processing resource to execute machine-readable instructions, stored in a non-transitory medium, to:
    arrange electrically non-conductive material relative to a receiving surface to additively form a monolithic three-dimensional (3D) object; and
    arrange, during additive formation of the 3D object, electrically conductive material to form a first conductive channel extending internally within the electrically non-conductive portion of the 3D object,
    wherein the arranging comprises arranging both the conductive and non-conductive materials as part of at least one of:
        a first single layer made via a single pass; and
        at least one second single layer made via multiple passes,
    wherein the instructions are to form the first conductive channel to mimic a contour of at least one non-linear portion of an exterior surface of the 3D object, wherein the at least one non-linear portion comprises a corner edge of the exterior surface of the 3D object, and wherein the first conductive channel is located within an interior of the 3D object spaced apart from the corner edge, and wherein opposite ends of the first conductive channel are exposed at spaced apart locations on the exterior surface of the 3D object.

5. A device including a processing resource to execute machine-readable instructions, stored in a non-transitory medium, to:
    arrange electrically non-conductive material relative to a receiving surface to additively form a monolithic three-dimensional (3D) object; and
    arrange, during additive formation of the 3D object, electrically conductive material to form a first conductive channel extending internally within the electrically non-conductive portion of the 3D object,
    wherein the arranging comprises arranging both the conductive and non-conductive materials as part of at least one of:

a first single layer made via a single pass; and
at least one second single layer made via multiple passes,
wherein the instructions to form the 3D object includes instructions to:
form the first conductive channel as a continuous sheet extending within and through the electrically non-conductive material of a length or a width of the 3D object to expose ends of the continuous sheet at spaced apart, exposed surfaces of opposite ends of the length or the width of the 3D object and to be releasably connectable to a measurement device to sense a fracture of the 3D object.

6. The device of claim 1, the instructions to implement a method of non-destructive fracture sensing of an electrically non-conductive body portion of the 3D object by measuring, via a connection to spaced apart portions of the first conductive channel, an electrical parameter associated with the first conductive channel.

7. The device of claim 1, wherein the instructions to form the 3D object includes instructions to cause formation of a first portion of the first conductive channel extending in a second orientation perpendicular to a first orientation through which at least one layer connection of the additively formed 3D object extends.

8. The device of claim 1, wherein the instructions to form the 3D object includes instructions to:
form at least one single layer of the successively deposited layers via multiple passes.

* * * * *